United States Patent
Duan et al.

(10) Patent No.: US 10,800,398 B2
(45) Date of Patent: Oct. 13, 2020

(54) HYBRID VEHICLE

(71) Applicant: FORD GLOBAL TECHNOLOGIES, LLC, Dearborn, MI (US)

(72) Inventors: Xiaohong Nina Duan, Canton, MI (US); Yanan Zhao, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 248 days.

(21) Appl. No.: 16/018,999

(22) Filed: Jun. 26, 2018

(65) Prior Publication Data
US 2019/0389452 A1    Dec. 26, 2019

(51) Int. Cl.
*B60W 20/13* (2016.01)
*B60W 10/08* (2006.01)
*B60W 10/26* (2006.01)
*B60W 10/30* (2006.01)
*B60W 20/12* (2016.01)
*B60W 10/06* (2006.01)

(52) U.S. Cl.
CPC ........... *B60W 20/13* (2016.01); *B60W 10/08* (2013.01); *B60W 10/26* (2013.01); *B60W 10/30* (2013.01); *B60W 20/12* (2016.01); *B60W 10/06* (2013.01); *B60W 2710/246* (2013.01)

(58) Field of Classification Search
None
See application file for complete search history.

(56) References Cited

U.S. PATENT DOCUMENTS

| 9,431,849 B2 | 8/2016 | Yan et al. | |
|---|---|---|---|
| 2012/0025762 A1* | 2/2012 | Lienkamp | H01M 10/625 320/109 |
| 2012/0280050 A1* | 11/2012 | Tonozuka | B60L 58/24 236/94 |
| 2016/0107526 A1 | 4/2016 | Jin et al. | |
| 2016/0129797 A1* | 5/2016 | Jackson | B60L 53/14 320/109 |
| 2017/0028978 A1* | 2/2017 | Dunlap | B60W 10/08 |
| 2017/0101030 A1* | 4/2017 | Hughes | B60L 58/26 |
| 2017/0129359 A1* | 5/2017 | Dunlap | B60L 58/26 |
| 2018/0072181 A1* | 3/2018 | Christen | B60L 58/26 |
| 2018/0141458 A1* | 5/2018 | Jammoul | H01M 10/613 |

FOREIGN PATENT DOCUMENTS

WO    2016083529 A1    6/2016

\* cited by examiner

*Primary Examiner* — Thomas G Black
*Assistant Examiner* — Demetra R Smith-Stewart
(74) *Attorney, Agent, or Firm* — David Kelley; Brooks Kushman P.C.

(57) ABSTRACT

A vehicle includes an electric machine, a battery, a cooler, and a controller. The electric machine is configured to propel the vehicle. The battery is configured to power the electric machine. The cooler is configured to cool the battery. The controller is programmed to, responsive to the vehicle traveling from first to second locations on a predetermined route, operate the electric machine such that battery charge is depleted from an initial charge at the first location to a minimum battery charge limit upon arrival at the second location. The controller is also programmed to, responsive to the vehicle traveling from first to second locations on a predetermined route, operate the cooler such that battery temperature increases from an initial temperature at the first location to a battery shutdown temperature limit at the second location.

20 Claims, 4 Drawing Sheets

HYBRID VEHICLE

TECHNICAL FIELD

The present disclosure relates to electric and hybrid vehicles, and control systems for electric and hybrid vehicles.

BACKGROUND

Electric and hybrid vehicles may utilize at least one electric power source, such as an electric machine, to propel the vehicle.

SUMMARY

A vehicle includes an elecricc machine, a battery, a cooler, and a controller. The electric machine is configured to propel the vehicle. The battery is configured to power the electric machine. The cooler is configured to cool the battery. The controller is programmed to, responsive to the vehicle traveling from the first to second locations on a predetermined route, operate the electric machine such that battery charge is depleted from an initial charge at the first location to a minimum battery charge limit upon arrival at the second location. The controller is also programmed to, responsive to the vehicle traveling from the first to second locations on a predetermined route, operate the cooler such that battery temperature increases from an initial temperature at the first location to a battery shutdown temperature limit at the second location.

A vehicle includes a battery, an electric machine, a battery cooler, and a controller. The battery powers the electric machine to propel the vehicle. The controller is programmed to, responsive ti the vehicle traveling to a destination on a predetermined route, operate the electric machine and cooler such that battery charge is depleted to a lower charge limit and the battery temperature increases to an upper temperature limit upon arrival at the destination.

A vehicle includes an electric machine, a battery, a cooling system, and a controller. The battery is configured to power the electric machine. The cooling system is configured to remove heat from the battery that is generated by discharging the battery. The controller is programmed to, reponsive to the vahicle traveling from first to second locations on a predetermined route, propel the vehicle via the electric machine and operate the cooling system such that battery charge decreases from an initial charge at the first location to a reduced charge at the second location, and such that battery temperature increases monotonically from an initial temperature at the first location to an upper temperature limit at the second location.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
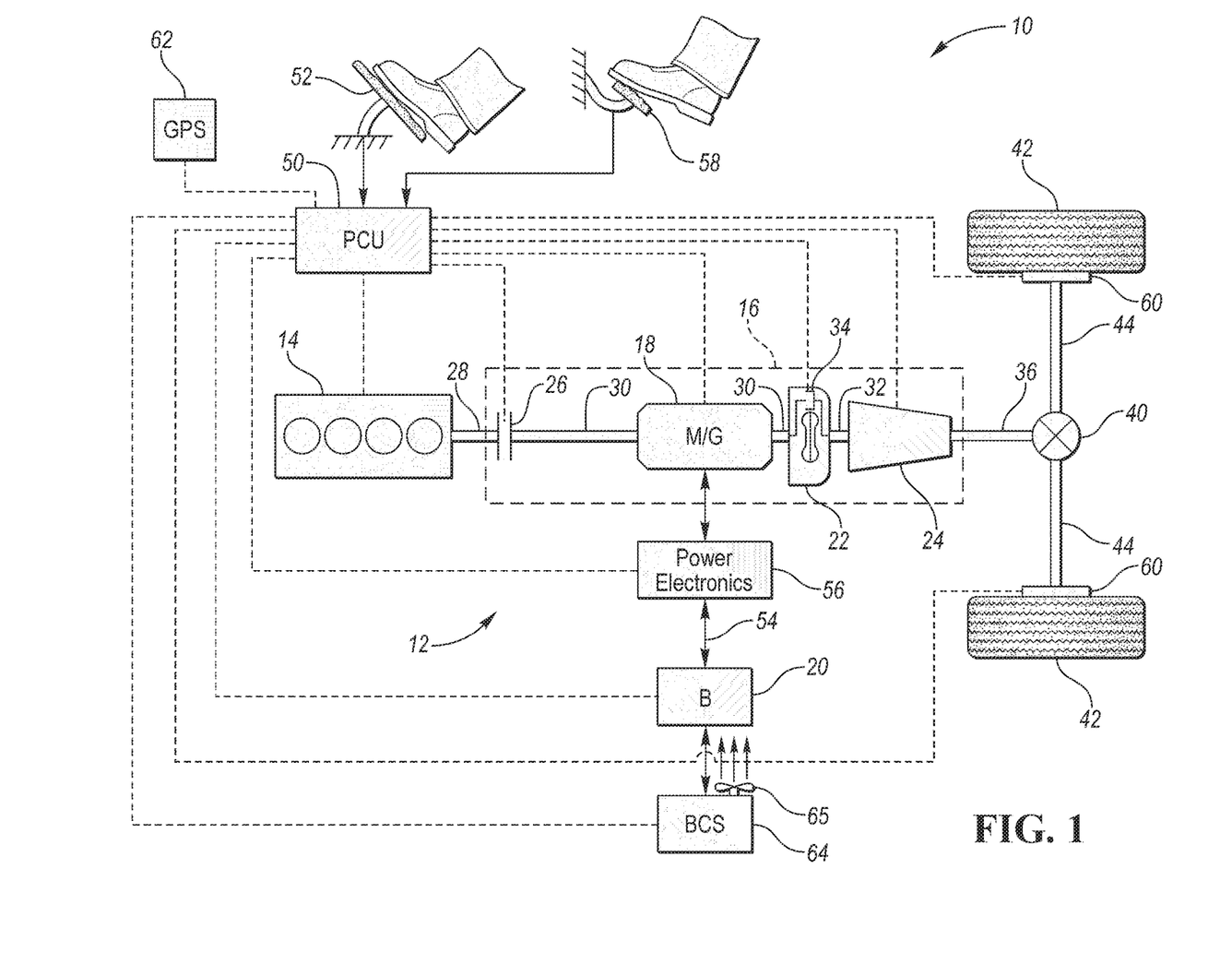
FIG. 1 is a schematic illustration of a representative powertrain of a hybrid electric vehicle.

Referring to FIG. 1, a schematic diagram of a schematic hybrid electric vehicle (HEV) 10 having parallel hybrid powertrain is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). The transmission 16 may be placed in PRNDSL (park, reverse, neutral, drive, sport, low) via transmission range selector. As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of drive wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to the powertrain 12 (or more specifically the engine 14 and/or M/G 18) to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque and/or power to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or kinetic) energy or power from spinning wheels 42 is transferred back through the gearbox 24, torque converter 22, (and/or torque converter bypass clutch 34) and is converted into electrical energy for storage in the battery 20.

The HEV 10 may also include global positioning system (GPS) 62 that may be in communication with the controller 50. The GPS 62 may be configured to determine the global coordinates of the HEV 10. The GPS 62 may be configured to determine and display the current location of the HEV 10. The GPS 62 may include road map and an algorithm that is configured to provided directions from the current location (which may be a starting location) to a desired destination. The GPS 62 may generate a predetermined route from the current location to the desired destination. Alternatively, the vehicle operator may manually select and input into the GPS 62 a desired predetermined route from the current location to the desired destination. A human machine interface (HMI) may be configured to receive the desired predetermined route and/or desired destination that is input from a vehicle operator. The input may be an address of the desired destination or a general geographical area. The HMI may include a display screen that outputs the current location and the predetermine route to the desired destination.

The HEV 10 may also include a battery cooler or cooling system 64 that is configured to cool the traction battery 20. The battery cooling system 64 may be an electrically powered cooling system the includes a fan 65 that is configured to direct air across the battery 20 in order to remove heat from and cool the battery 20. Alternatively, the battery cooling system 64 may be an electrically powered cooling system the includes an electric pump that is configured to direct a liquid coolant or refrigerant across the battery 20 in order to remove heat from and cool the battery 20. A temperature sensor (not shown) may be configured to detect the current temperature of the battery 20 and relay the current temperature of the battery 20 to the controller 50.

The controller 50 may then be configured to adjust the operating parameters based on the current temperature of the battery 20 and a desired temperature of the battery. If additional cooling is required, the controller 50 may increase the output of the cooling system 64, which in turn increases the electrical power required to operate the cooling system 64. If less cooling is required, the controller 50 may decrease the output of the cooling system 64, which in turn decreases the electrical power required to operate the cooling system 64.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the disclosure. It should be understood that the vehicle configuration described herein is merely exemplary and is not intended to be limited.

It should further be understood that the vehicle configuration described herein is merely exemplary and is not intended to be limited. Other hybrid or electric vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Certain types of vehicles, such as vehicles used for mail delivery, school buses, public transportation vehicles, performance vehicles driven under racing conditions on race tracks, etc. may be operated along predetermined driving routes. The predetermined driving routes may have designated vehicle speed limits, predetermined stopping locations (e.g., stops signs, pick-up and drop-off locations for passengers), predetermined acceleration segments (e.g., after a sharp curve or accelerating after reaching a stop sign or traffic light), and deceleration segments (e.g., a sharp curve or approaching a stop sign or red traffic light).

For performance hybrid or electric vehicles, the power from the high voltage traction battery power may be discharged during driving to boost the propulsive power (i.e., the battery may direct power to an electric machine to assist in propelling the vehicle). The traction battery may be charged via regenerative braking or via the engine. During both charging and discharging, the traction battery generates heat which causes the temperature of the battery to increase. When battery temperature reaches a cutoff limit, $T_{power\_cutoff}$, the allowable (or maximum) battery power output will be limited (i.e., decreased). As the battery temperature continues to increase above the cutoff limit, $T_{power\_cutoff}$, allowable battery power output will continue to gradually decrease to zero once battery temperature reaches a shutdown threshold that is greater than cutoff limit, $T_{power\_cutoff}$. The allowable battery power output may decrease linearly as the battery temperature increases from the cutoff limit, $T_{power\_cutoff}$, to the shutdown threshold.

In order to ensure the traction battery remains below the temperature of power cutoff limit ($T_{bat} < T_{power\_cutoff}$), the battery needs to be cooled. Cooling the battery requires consuming energy at the cost of reducing the vehicle's propulsive energy, since battery power or engine power will need to be diverted to operate a cooling system of the battery. For performance hybrid or electric vehicles, it is desired to keep battery temperature under the cutoff limit $T_{power\_cutoff}$, while simultaneously minimizing the energy utilized by the cooling system of the battery, in order maximize the available propulsive energy in order to meet the vehicle's performance target.

For performance vehicles being operated under racing conditions, the thermal problems can be different based on the type of race (hot or sustained lap). For example, during a hot lap race (where the performance target is the fastest time for a single lap), when the battery is used very aggressively and when the temperature of the environment surrounding of the battery is high, the rate at which the cooling system is capable removing heat from the battery may be less than the rate at which the battery is generating heat, resulting in the battery temperature quickly rising and reaching the cutoff limit, $T_{power\_cutoff}$, before the race ends. In order to control and reduce the battery temperature (e.g., via increasing the flow rate of air across the battery or the flow rate of a liquid coolant or refrigerant through the battery), the cooling system will need to operate at a high output which consumes additional electrical power that may have been used to propel the vehicle, affecting the race performance by reducing the amount of propulsive power. For a sustained lap race (where the performance target is that fastest time for a multiple number of laps that a single tank of fuel that powers an engine can accomplish), it may be desirable for the battery to provide consistent power to increase the propulsive power output of the vehicle during the entire race in order to achieve consistent performance. The battery energy output and range of temperature increase will need to be appropriately budgeted across each lap to achieve a consistent power output of the battery during the entire race.

In order to minimize battery cooling energy while simultaneously maintaining battery temperature within the allowed working range (i.e., below the cutoff limit, $T_{power\_cutoff}$), a battery temperature variation curve vs. distance traveled (or vs. a location) on a predetermined driving route is generated. The battery temperature variation curve vs. distance traveled (or vs. a location) on the predetermined driving route may also be referred to as the optimal battery temperature curve. The optimal battery temperature curve restrains the battery temperature operating range such battery temperature is increased from an initial battery temperature to a predefined temperature limit at the end of a predetermined route or at a location on the predetermined route where the battery will become depleted. The optimal battery temperature curve is optimized according to a cost function to minimize battery cooling energy utilized on the predetermined driving route.

Figure 2:
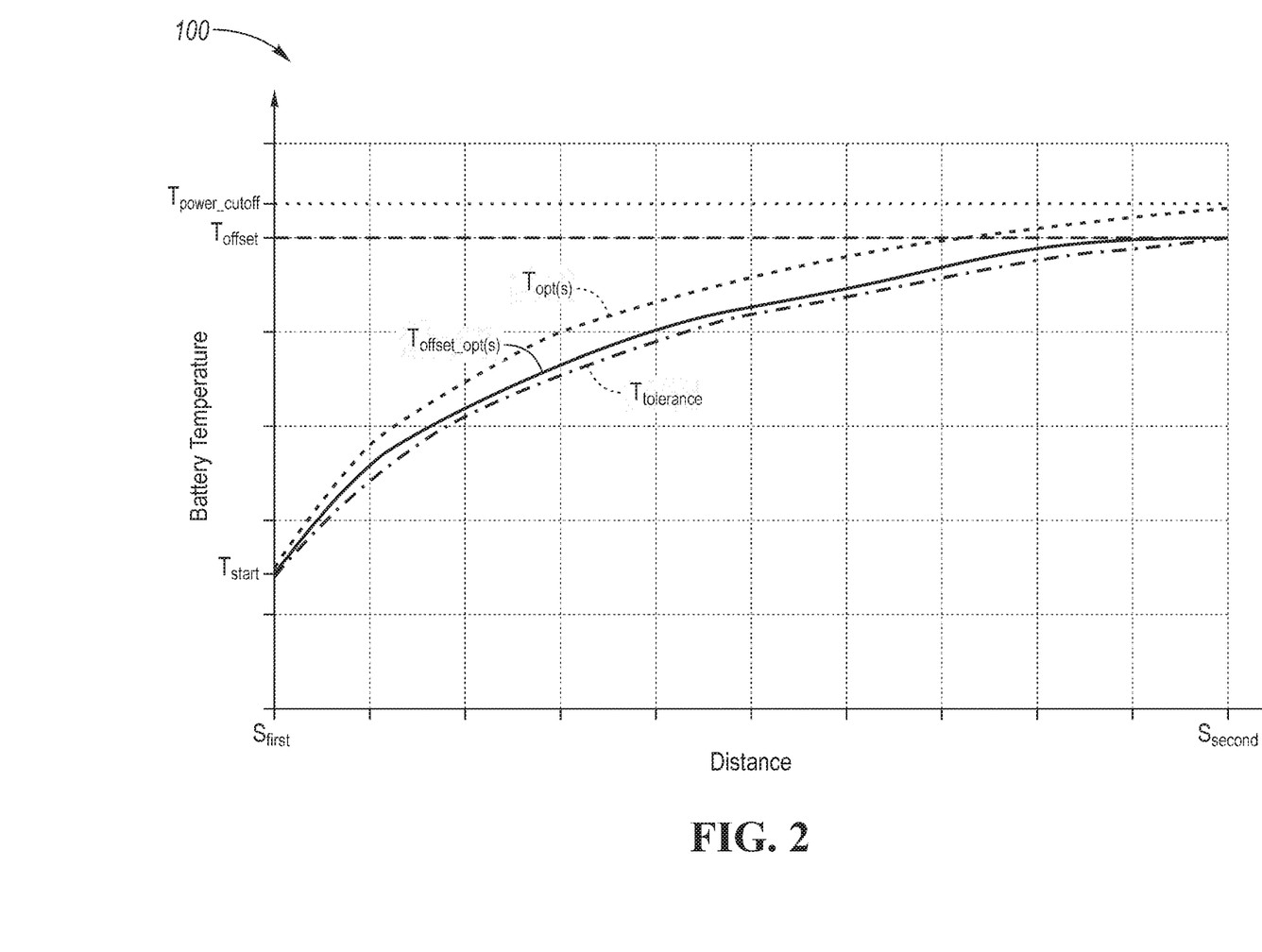
FIG. 2 is a graph illustrating an example optimal temperature curve for battery temperature relative to the distance traveled along a predetermined route.

Referring to FIG. 2, a graph 100 of an example optimal battery temperature curve, $T_{opt(s)}$, for battery temperature, $T_{bat}$, relative to the distance traveled, s, along a predetermined route is illustrated. The optimal battery temperature curve, $T_{opt(s)}$, may be stored within the controller 50. The controller 50 is then configured to operate the M/G 18, the traction battery 20, and the battery cooling system 64 according to the optimal battery temperature curve, $T_{opt(s)}$, in order to maximize the electric propulsion output of the HEV 10 along the predetermined route (i.e., to maximize the electric power output from the battery 20 that is transferred to the M/G 18 for propelling the HEV 10), and to minimize the electrical power consumed by the battery cooling system 64.

In order to minimize the power electrical power consumed by the battery cooling system 64, the battery temperature, $T_{bat}$, is allowed to increase monotonically along the optimal battery temperature curve, $T_{opt(s)}$, from a starting temperature, $T_{start}$, at a first location, $s_{first}$, on the predetermined route to the cutoff limit, $T_{power\_cutoff}$, at a second location, $s_{second}$, on the predetermined route. The difference between the first location, $s_{first}$, and second location, $s_{second}$, on the predetermined route is representative of a distance traveled along the predetermined route. Alternatively, battery temperature, $T_{bat}$, may be allowed to increase monotonically along the optimal battery temperature curve, $T_{opt(s)}$, from a starting temperature, $T_{start}$, at the first location, $s_{first}$, to an offset value, $T_{offset}$, below the cutoff limit, $T_{power\_cutoff}$, at a second location, $s_{second}$. The first location, $s_{first}$, may correspond to a start position on the predetermined route. The second location, $s_{second}$, may corresponds to an end position on the predetermined route and/or a position on the predetermined route where the battery 20 will be depleted to a minimum charge limit where the battery 20 is prevented from further discharging electric power.

In order to maximize the electric propulsion output of the HEV 10 along the predetermined path, the total amount of power from the battery 20 that may be converted into propulsion power is determined. The total amount of energy from the battery 20 that may be converted to propel the vehicle includes the amount of stored battery energy at the first location, $s_{first}$, on the predetermined route, plus any additional battery energy that will be recovered via regenerative braking between the first location, $s_{first}$, and the second location, $s_{second}$, and minus energy from the battery 20 that will be utilized to cool the battery according to the optimal battery temperature curve, $T_{opt(s)}$. The total amount of energy from the battery 20 that may be converted to propel the vehicle is then budgeted along the predetermined route to propel the vehicle such that the battery 20 is completely depleted at the second location, $s_{second}$, on the predetermined route, or so that the battery energy converted to propel the vehicle is maximized upon reaching the second location, $s_{second}$, on the predetermined route, if the second location is the end position on the predetermined route.

The algorithm for determining the optimal temperature curve, $T_{opt(s)}$, may be stored as control logic within the controller 50. More specifically, the optimal temperature curve, $T_{opt(s)}$, may be based on equations (1) and (2):

$$T_{bat} = T_{start} + \frac{1}{\alpha}\left\{\int_0^{s\_total} I^2 R(SoC)ds - \int_0^{s\_total} h(P\_cooling)(T_{bat} - T_{environment})ds\right\} \quad (1)$$

$$E_{cooling} = \int_0^{s\_total} P\_cooling \, ds \quad (2)$$

where $T_{bat}$ is the temperature of the battery 20, $T_{start}$ is starting or initial temperature of the battery 20, α is the heat capacity of the battery 20, $S_{total}$ is total distance to be traveled on the predetermine route, I is the current flow of the battery, R(SoC) is internal resistance of the battery 20 which is a function of the state of charge, SoC, of the battery 20, h is the heat convection coefficient of the battery 20, P_cooling is power utilized to cool the battery 20, $T_{enviroment}$ is the temperature of the environment (e.g., the surrounding ambient air temperature), and $E_{cooling}$ is the energy utilized to cool the battery 20 along the predetermined route. It should be noted that the heat convection coefficient of the battery, h, is a function of power utilized to cool the battery, P_cooling in equation (1). It should further be noted that the integral in equations (1) and (2) may be taken from the first location, $s_{first}$, and the second location, $s_{second}$, along the predetermined route as opposed to being taken from the total distance traveled on the predetermine route, $S_{total}$, and zero.

The change in battery temperature determined in equation (1) is based on energy exchanges within battery 20. The heat generated by the energy exchanges within the battery 20 that results in a temperature change of the battery 20 is represented by equation (3):

$$H_{battTempChg} = \{(\text{Energy in} - \text{Energy out}) - (\text{internal Energy Change})\} - \text{Heat out}\} \quad (3)$$

where $H_{battTempChg}$ is the heat generated by the energy exchanges within the battery 20 that results in a temperature change of the battery 20, Energy in is electrical energy utilized to charge the battery 20, Energy out is electrical energy that is discharged from the battery 20, internal Energy Change is the internal energy change of the battery expressed by a change in the state of charge, SoC, of the battery 20, and Heat out is the amount of thermal energy that transferred from the battery 20 to the external environment by the battery cooling system 64.

The portion of equation (3) that includes all internal energy exchanges within the battery that ignores the amount of thermal energy that is transferred from the battery 20 to the external environment, i.e., (Energy in−Energy out)−(internal Energy Change), may be further expressed by equation (4):

$$(\text{Energy in} - \text{Energy out}) - (\text{internal Energy Change}) = (\text{Energy in} - \text{Energy out}) \, (\text{Internal Energy} (SoC_{start}) - \text{Internal Energy} (SoC)) = \int_0^S I^2 R(Soc) ds \quad (4)$$

where SoC is the state of charge of the battery 20, $SoC_{start}$ is the state of charge of the battery 20 at a starting position along the predetermined route (or the state of charge of the battery 20 at the first location, $s_{first}$, along the predetermined route), s is distance traveled along the predetermined route, internal Energy ($SoC_{start}$) is the internal energy based on the state of charge of the battery 20 at the starting position along the predetermined route (or the state of charge of the battery 20 at the first location, $s_{first}$, along the predetermined route), and Internal Energy (SoC) is the internal energy based on state of charge of the battery 20 at a second position corresponding to the distance traveled, s, along the predetermined route.

The portion of equation (3) that includes the thermal energy that is transferred from the battery 20 to the external environment, Heat out, may be represented by equation (5):

$$\text{Heat out} = \int_0^S h \times (T_{bat} - T_{enviroment}) dS \quad (5)$$

Figure 3:
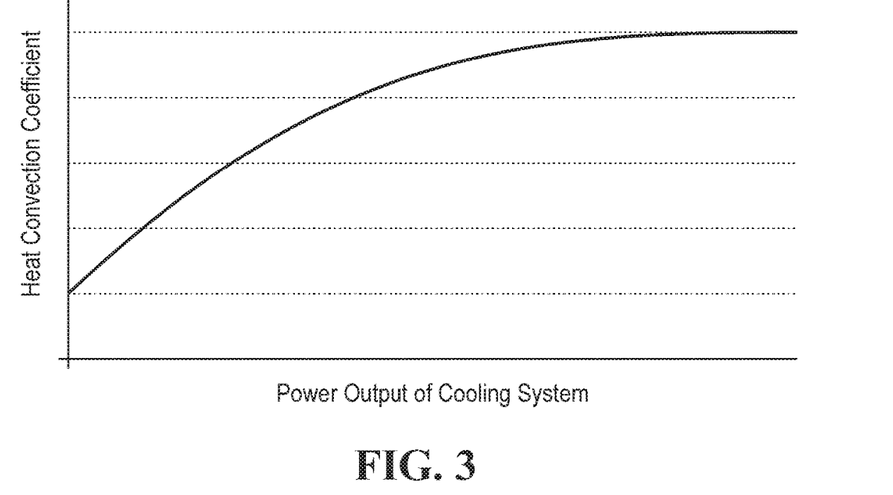
FIG. 3 is a graph illustrating a heat convection coefficient of the battery relative to the power utilized to cool the battery.

Heat out depends on the design of battery cooling system 64. For example, Heat out is dependent on the initial (or inlet) the temperature of a fluid (e.g., air in an air-cooled system or a liquid coolant is a liquid-cooled system) that is being utilized to cool the battery 20. The heat convection coefficient of the battery, h, is a function of the power utilized to cool the battery, P_cooling. More specifically, the heat convection coefficient of the battery, h, is a function of the flow rate of the fluid that is cooling battery that increases as the flow rate increases. Even more specifically, the heat convection coefficient of the battery, h, may increase proportionally or approximately proportionally relative to an increase in the flow rate of the fluid that is cooling battery 20, within a specific range of the flow rate. The heat convection coefficient of the battery, h, eventually saturates (i.e., maintains a relatively constant value above) specific flow rate. This is shown in FIG. 3, which illustrates the heat convection coefficient of the battery, h, vs. the power utilized, P_cooling, to cool the battery 20. The flow rate may be determined by a rotational speed for a fan that directs air across the battery 20 in an air-cooled system or a rotational speed of a pump that directs a liquid coolant across or through conduits adjacent to the battery 20 in a liquid-cooled system. The flow rate will increase as the rotational speed of the fan or pump is increased.

Based on the relationship between the heat convection coefficient of the battery, h, and the power utilized to cool the battery, P_cooling, a smaller heat convection coefficient of the battery, h, value will result in less heat dispersing, resulting in a greater increase in the temperature of the battery 20. If temperature of the battery 20 is allowed to rise as high as possible, the energy used for cooling will be less.

Utilizing equations (3)-(5), the heat generated by the energy exchanges within the battery 20 that results in a temperature change of the battery, $H_{battTempChg}$, may further be represented by equation (6)

$$H_{battTempChg} = \int_s^{s+\Delta s} I^2 R(SoC) ds - \int_s^{s+\Delta s} h \times (T_{bat} - T_{enviroment}) ds \quad (6)$$

where $\Delta s$ is the distance traveled along a predetermined route.

The heat generated by the energy exchanges within the battery 20 that results in a temperature change of the battery, $H_{battTempChg}$, may also be represented by equation (7):

$$H_{battTempChg} = \alpha \Delta T_{bat} \quad (7)$$

where $\Delta T_{bat}$ is a change in battery temperature.

The relationships between equations (6) and (7) may then be utilized to derive equations (8) and (9):

$$\alpha \Delta T_{batt} = \int_s^{s+\Delta s} I^2 R(SoC) ds - \int_s^{s+\Delta s} h \times (T_{bat} - T_{environment}) ds \quad (8)$$

$$\Delta T_{batt} = \frac{1}{\alpha} \left\{ \int_s^{s+\Delta s} I^2 R(SoC) ds - \int_s^{s+\Delta s} h \times (T_{bat} - T_{environment}) ds \right\} \quad (9)$$

Equation (8) may then be adjusted such that the heat convection coefficient of the battery, h, is expressed as a function of the power utilized to cool the battery, P_cooling, and $\Delta T_{batt}$ may be added to the initial temperature of the battery, $T_{start}$, to obtain the current or actual temperature of the battery, $T_{bat}$, which results in equation (1):

$$T_{bat} = T_{start} + \frac{1}{\alpha} \left\{ \int_0^{s\_total} I^2 R(SoC) ds - \int_0^{s\_total} h(\text{P\_cooling})(T_{bat} - T_{environment}) ds \right\} \quad (1)$$

In order obtain a desired performance target (e.g., a target time travel from first to second locations on the predetermined route) which maximizes the electric propulsion output of the HEV 10 along the predetermined route (i.e., to maximize the electric power output from the battery 20 that is transferred to the M/G 18 for propelling the HEV 10) while also minimizing the electrical power consumed by the battery cooling system 64, the optimal battery temperature curve, $T_{opt(s)}$, may be determined based on by applying constraints to equations (1)-(9). The constraints may include: 1. using the energy stored within the battery 20 to operate the M/G 18 to propel the HEV 10 such that the state of charge, SoC, of the battery 20 is decreased from a current value, $SoC_{current}$ (which may be a maximum state of charge value $SoC_{max}$), at the first location, $s_{first}$, along the predetermined route to a minimum state of charge value, $SoC_{min}$, at the second location, $s_{second}$, along the predetermined; 2 minimizing the energy utilized to cool the battery 20 along the predetermined route, $E_{cooling}$; 3. operating the battery cooling system 64 such that the temperature of the battery, $T_{bat}$, does not reach cutoff limit, $T_{power\_cutoff}$ (or an offset value, $T_{offset}$, below the cutoff limit, $T_{power\_cutoff}$), prior to the state of charge, SoC, of the battery 20 reaching the minimum state of charge value, $SoC_{min}$, and prior to the HEV 10 reaching the second location, $s_{second}$, along the predetermined route (which may be correspond to the end of the predetermined route where the total distance traveled, $S_{total}$, is obtained); and 4. maximizing the amount of fuel utilized by the engine 14 to assist in propelling the vehicle (this may include entirely using a full tank of fuel). The maximum state of charge value $SoC_{max}$ may correspond to the maximum amount of electrical energy that may be stored within the battery 20. The minimum state of charge value, $SoC_{min}$, may correspond with either completely depleting the battery or decreasing the battery to a minimum charge where the controller 50 prevents further discharge of the battery 20.

When the constraints that are applied to questions (1)-(9) are considered, the energy that is used to propel the HEV 10 is budgeted so that the battery current flow needed for the vehicle at specified locations, and the root mean square current (IRMS) value along the predetermine route can be estimated, as well as the value of the required power output of the traction battery, and $I^2 R(SoC)$ along the predetermined route. The optimal battery temperature curve, $T_{opt(s)}$, may then be determined by minimizing equation (2), i.e., the energy utilized to cool the battery 20 along the predetermined route, $E_{cooling}$, from the first location, $s_{first}$, to the second location, $s_{second}$, and by setting equation (1) such that the battery temperature reaches the temperature cutoff limit, $T_{power\_cutoff}$ (or an offset value, $T_{offset}$, below the cutoff limit, $T_{power\_cutoff}$), upon reaching the second location, $s_{second}$, from the initial temperature of the battery, $T_{start}$, at the first location, $s_{first}$. Equations (2) and (1), once adjusted to generate the optimal battery temperature curve, $T_{opt(s)}$, may be represented by equations (10) and (11), respectively:

$$J = \min\left(E_{cooling} = \int_0^{S\_total} P\_cooling \, ds\right) \quad (10)$$

$$T_{power\_cutoff} = T_{start} + \frac{1}{\alpha}\left\{\int_0^{S\_total} I^2 R(SoC) ds - \int_0^{S\_total} h(P\_cooling)(T_{bat} - T_{environment}) ds\right\} \quad (11)$$

where J is the minimized value of the energy utilized to cool the battery 20 along the predetermined route, $E_{cooling}$, from the first location, $s_{first}$, to the second location, $s_{second}$. It is noted the that the integrals in equations (10) and (11) may be taken from location, $s_{first}$, and the second location, $s_{second}$, along the predetermined route as opposed to being taken from the total distance to traveled on the predetermine route, $S_{total}$, and zero.

Figure 4:
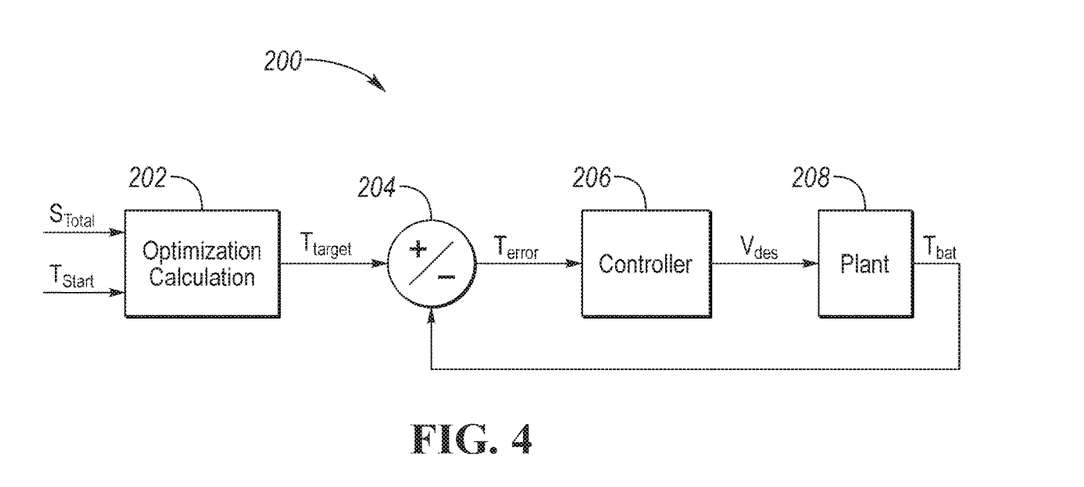
FIG. 4 is a control diagram illustrating a control system for adjusting the output of a battery cooling system.

Referring to FIG. 4, a control diagram illustrating a control system 200 for adjusting the output of the battery cooling system 64 is illustrated. The control system 200 may be stored as control logic within and implemented by a controller (e.g., controller 50). The control system 200 may be configured to adjust the speed of the fan 65 that directs air across the battery 20. Alternatively, control system 200 may configured to adjust the speed of a pump that directs a liquid coolant across or through conduits adjacent to the battery 20. The control system 200 in FIG. 4 is configured to continuously adjust the speed of the fan 65 (or alternatively a pump in liquid cooled systems). The control system is initiated by determining the target temperature, $T_{target}$, of the battery 20. The target temperature, $T_{target}$, of the battery 20 may correspond to the optimal temperature curve, $T_{opt(s)}$, to obtain the cutoff limit, $T_{power\_cutoff}$, upon reaching the second location, $s_{second}$, along the predetermined route, according to equations (1)-(11) above. Alternatively, the target temperature, $T_{target}$, of the battery 20 may correspond to generating an offset optimal temperature curve, $T_{offset\_opt(s)}$ (see FIG. 2), to obtain the offset value, $T_{offset}$, which is below the cutoff limit, $T_{power\_cutoff}$, at the second location, $s_{second}$, along the predetermined route, according to equations (1)-(11) above. The offset optimal temperature curve, $T_{offset\_opt(s)}$, may be utilized as a clip protection to ensure the target temperature, $T_{target}$, of the battery 20 remains at or within an allowable tolerance, $T_{tolerance}$ (see FIG. 2), at or below the optimal temperature curve, $T_{opt(s)}$.

The initial temperature of the battery, $T_{start}$, and the total distance to traveled on the predetermine route, $S_{total}$ (which may correspond to the difference between the first location, $s_{first}$, and the second location, $s_{second}$, along the predetermined route), are input into optimization calculation block 202. The optimization calculation block 202 then outputs the target temperature, $T_{target}$, of the battery 20. An actual temperature of the battery, $T_{bat}$, is subtracted from the target temperature, $T_{target}$, of the battery 20 at block 204. The actual temperature of the battery, $T_{bat}$, is supplied from the battery 20 to block 204 by a feedback loop. The actual temperature of the battery, $T_{bat}$, may be determined by a temperature sensor. An error (or difference), $T_{error}$, between the target temperature, $T_{target}$, of the battery 20 and the actual temperature of the battery 20, $T_{bat}$, is then input into controller 206. The controller 206 may be proportional-integral-derivative (PID) controller, a predictive controller, or any other type of feedback adjustment controller know to a person of ordinary skill in the art.

The controller 206 then outputs a desired speed, $V_{des}$, of the fan 65 (or alternatively a pump in liquid cooled systems) to drive the actual temperature of the battery, $T_{bat}$, toward the target temperature, $T_{target}$, of the battery 20 in order to reduce or eliminate the error (or difference), $T_{error}$, between the target temperature, $T_{target}$, of the battery 20 and the actual temperature of the battery 20. The desired speed, $V_{des}$, of the fan 65 (or alternatively a pump in liquid cooled systems) is then input into the plant 208 (which includes the fan 65 or alternatively a pump) to adjust the speed of the fan 65 (or alternatively a pump in liquid cooled systems) to the desired speed, $V_{des}$. The plant 208 also includes the battery 20, which supplies the actual temperature of the battery, $T_{bat}$, to block 204 via the feedback loop. If the target temperature, $T_{target}$, of the battery 20 and the actual temperature of the battery 20 are equal, the speed of the fan 65 (or alternatively a pump in liquid cooled systems) will not be changed, if the target temperature, $T_{target}$, of the battery 20 is greater than the actual temperature of the battery 20, the speed of the fan 65 (or alternatively a pump in liquid cooled systems) will decrease, if the target temperature, $T_{target}$, of the battery 20 is less than the actual temperature of the battery 20, the speed of the fan 65 (or alternatively a pump in liquid cooled systems), will increase.

Figure 5:
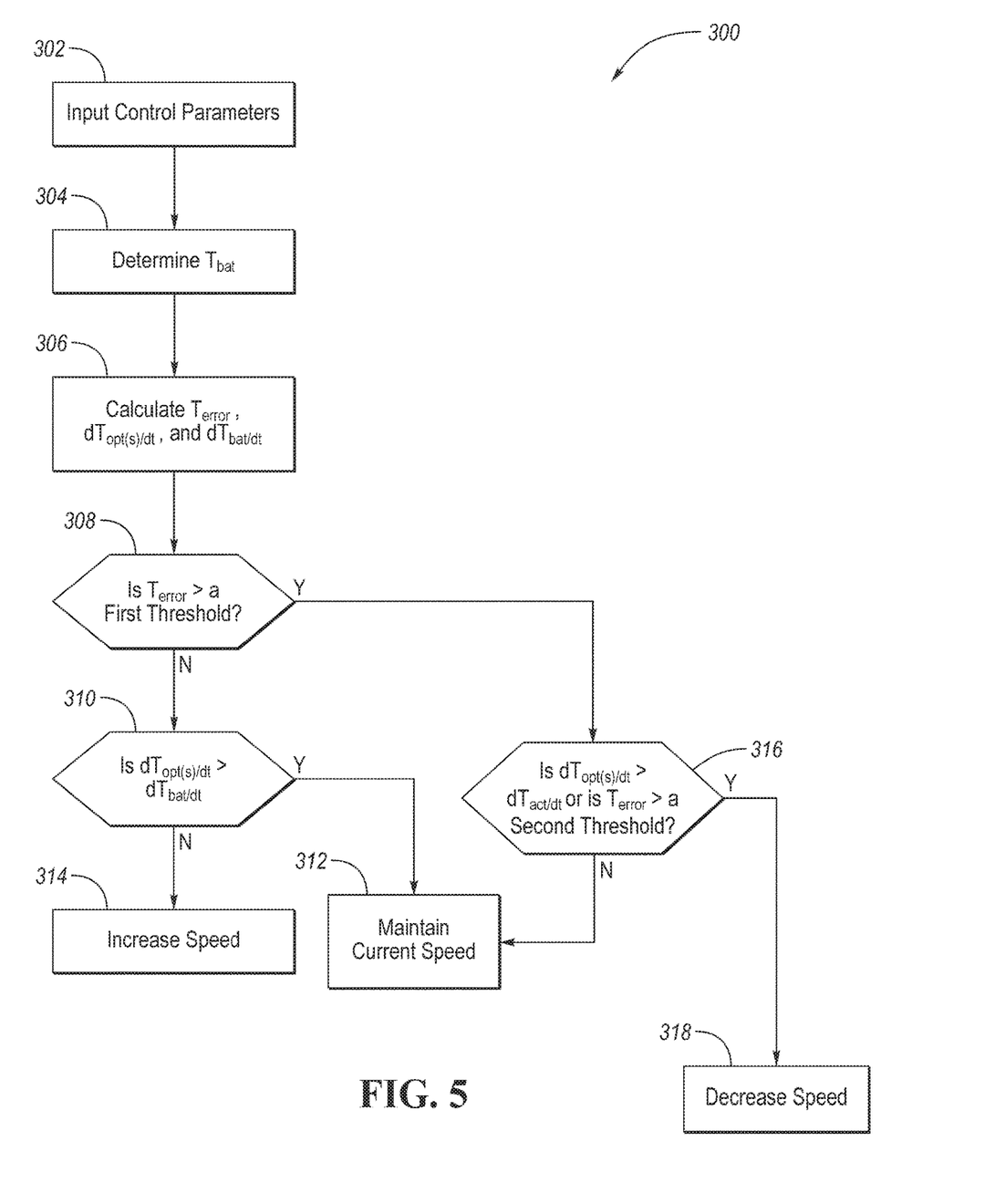
FIG. 5 is a flowchart illustrating an alternative embodiment of a control system for adjusting the output of a battery cooling system.

Referring to FIG. 5, a flowchart illustrating an alternative embodiment of a control system 300 for adjusting the output of a battery cooling system 64 is illustrated. The control system 300 may be stored as control logic within and implemented by a controller (e.g., controller 50). The control system 300 may be configured to adjust the speed of the fan 65 that directs air across the battery 20. Alternatively, control system 300 may configured to adjust the speed of a pump that directs a liquid coolant across or through conduits adjacent to the battery 20. The control system 300 in FIG. 5 is configured to step adjust the speed of the fan 65 (or alternatively a pump in liquid cooled systems). The step adjustment is configured to maintain an actual temperature of the battery, $T_{bat}$, that is close to but slightly below the optimal temperature curve, $T_{opt(s)}$.

The control system 300 begins at block 302 where the control parameters, including the initial temperature of the battery, $T_{start}$, the temperature cutoff limit, $T_{power\_cutoff}$, of the battery 20, the first location, $s_{first}$, on the predetermined route, the second location, $s_{second}$, on the predetermined route, the required power output of the traction battery, $I^2R$ (SoC), the initial battery charge (i.e., the amount of electrical energy stored in the battery 20 at the first location, $s_{first}$), and any other control parameter discussed above are input into a controller (e.g., controller 50) to determine the optimal temperature curve, $T_{opt(s)}$. Next the control system 300 moves on to block 304 where the actual temperature of the battery, $T_{bat}$, is determined. The actual temperature of the battery, $T_{bat}$, may be determined by a temperature sensor. Next, the method moves on to block 306 where an error (or difference), $T_{error}$, between the optimal temperature, $T_{opt(s)}$, of the battery 20 and the actual temperature of the battery 20, $T_{bat}$, a rate of change in the optimal temperature vs. time, $$\frac{dT_{opt(s)}}{dt},$$

and a rate of change in the actual temperature vs. time, $$\frac{dT_{bat}}{dt},$$

are all determined.

The control system 300 next moves from block 306 to block 308 where it is determined if the error (or difference), $T_{error}$, between the optimal temperature, $T_{opt(s)}$, of the battery 20 and the actual temperature of the battery 20, $T_{bat}$, is greater than a first threshold. If the error, $T_{error}$, is not greater than the first threshold, the control system moves on to block 310 where it is determined if the rate of change in the optimal temperature vs. time, $$\frac{dT_{opt(s)}}{dt},$$

is greater than the rate of change in the actual temperature vs. time, $$\frac{dT_{bat}}{dt}.$$

If the rate of change in the optimal temperature vs. time, $$\frac{dT_{opt(s)}}{dt},$$

is greater than the rate of change in the actual temperature vs. time, $$\frac{dT_{bat}}{dt},$$

the control method 300 moves on to block 312 where the control method 300 maintains the current speed of the fan 65 (or alternatively a pump in liquid cooled systems). If the rate of change in the optimal temperature vs. time, $$\frac{dT_{opt(s)}}{dt},$$

is not greater than the rate of change in the actual temperature vs. time, $$\frac{dT_{bat}}{dt},$$

the control method 300 moves on to block 314 where the control method 300 increases the speed of the fan 65 (or alternatively a pump in liquid cooled systems).

Returning to block 308, if the error, $T_{error}$, is greater than the first threshold, the control system moves on to block 316 where it is determined if the rate of change in the optimal temperature vs. time, $$\frac{dT_{opt(s)}}{dt},$$

is greater than the rate of change in the actual temperature vs. time, $$\frac{dT_{bat}}{dt},$$

or if the error (or difference), $T_{error}$, between the optimal temperature, $T_{opt(s)}$, of the battery 20 and the actual temperature of the battery 20, $T_{bat}$, is greater than a second threshold. If the rate of change in the optimal temperature vs. time, $$\frac{dT_{opt(s)}}{dt},$$

is greater than the rate of change in the actual temperature vs. time, $$\frac{dT_{bat}}{dt},$$

or if the error, $T_{error}$, is greater than the second threshold at block 316, the control method 300 moves on to block 318 where the control method 300 decreases the speed of the fan 65 (or alternatively a pump in liquid cooled systems). If the rate of change in the optimal temperature vs. time, $$\frac{dT_{opt(s)}}{dt},$$

is not greater than the rate of change in the actual temperature vs. time, $$\frac{dT_{bat}}{dt},$$

or if $T_{error}$, is not greater than the second threshold at block 316, the control method 300 moves on to block 312 where the control method 300 maintains the current speed of the fan 65 (or alternatively a pump in liquid cooled systems).

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
an electric machine configured to propel the vehicle;
a battery configured to power the electric machine;
a cooler configured to cool the battery; and a controller programmed to,
   responsive to a command to propel the vehicle, adjust a battery power output to a value between zero and an allowable power output,
   responsive to a battery temperature increasing to greater than an upper temperature limit, reduce the allowable power output, and
   responsive to the vehicle traveling from first to second locations on a predetermined route,
      operate the electric machine such that battery charge is depleted from an initial charge at departure from the first location to a minimum battery charge limit upon arrival at the second location, and
      operate the cooler such that the battery temperature increases monotonically from an initial temperature at departure from the first location to the upper temperature limit upon arrival at the second location.

2. The vehicle of claim 1, wherein the battery temperature increases monotonically from the initial temperature at departure from the first location to the upper temperature limit upon arrival at the second location according to an optimal temperature curve that minimizes the energy utilized by the cooler from the first location to the second location.

3. The vehicle of claim 2, wherein the energy utilized by the cooler from the first location to the second location is minimized according to the optimal temperature curve that is based on the initial temperature, the upper temperature limit, and expected heat generated by the battery from the first location to the second location.

4. The vehicle of claim 3, wherein the optimal temperature curve is based on an integration of the expected heat generated by the battery over the distance traveled between the first location and the second location.

5. The vehicle of claim 2, wherein the cooler includes a fan that directs air across the battery.

6. The vehicle of claim 5, wherein the controller is configured to adjust speed of the fan to maintain battery temperature at or within an allowable tolerance below the optimal temperature curve.

7. A vehicle comprising:
a battery powering an electric machine to propel the vehicle;
a battery cooler; and
a controller programmed to,
   responsive to a command to propel the vehicle, adjust a battery power output to a value between zero and an allowable power output,
   responsive to a battery temperature increasing to greater than an upper temperature limit, reduce the allowable power output, and
   responsive to the vehicle traveling to a destination on a predetermined route, operate the electric machine and cooler such that battery charge is depleted to a lower charge limit and such that the battery temperature increases monotonically along the predetermined route from an initial temperature at a starting location to the upper temperature limit upon arrival at the destination.

8. The vehicle of claim 7, wherein the battery temperature increases monotonically along the predetermined route from the initial temperature to the upper temperature limit at the destination according to an optimal temperature curve that minimizes the energy utilized by the cooler along the predetermined route.

9. The vehicle of claim 8, wherein the energy utilized by the cooler along the predetermined route is minimized according to the optimal temperature curve that is based on the initial battery temperature at the starting location of the route, the upper temperature limit, and expected heat generated by the battery along the predetermined route.

10. The vehicle of claim 9, wherein the optimal temperature curve is based on an integration of the expected heat generated by the battery over the distance traveled between the starting location and the destination.

11. The vehicle of claim 8, wherein the battery includes a fan that directs air across the battery.

12. The vehicle of claim 11, wherein the controller is configured to adjust a speed of the fan to maintain battery temperature at or within an allowable tolerance below the optimal temperature curve.

13. A vehicle comprising:
an electric machine;
a battery configured to power the electric machine;
a cooling system configured to remove heat from the battery that is generated by discharging the battery; and
a controller programmed to,
   responsive to a command to propel the vehicle, adjust a battery power output to a value between zero and an allowable power output,
   responsive to a battery temperature increasing to greater than the upper temperature limit, reduce the allowable power output, and
   responsive to the vehicle traveling from first to second locations on a predetermined route, propel the vehicle via the electric machine and operate the cooling system such that battery charge decreases from an initial charge at departure from the first location to a reduced charge upon arrival at the second location, and such that the battery temperature increases monotonically from an initial temperature at departure from the first location to an upper temperature limit upon arrival at the second location.

14. The vehicle of claim 13, wherein the battery temperature increases monotonically from the initial temperature at the first location to the upper temperature limit at the second location according to an optimal temperature curve that minimizes the energy utilized by the cooling system from the first location to the second location.

15. The vehicle of claim 14, wherein the energy utilized by the cooling system from the first location to the second location is minimized according to the optimal temperature curve that is based on the initial temperature, the upper temperature limit, and expected heat generated by the battery from the first location to the second location.

16. The vehicle of claim 15, wherein the optimal temperature curve is based on an integration of the expected heat generated by the battery over the distance traveled between the first location and the second location.

17. The vehicle of claim 14, wherein the cooling system includes a fan that directs air across the battery, and wherein the controller is configured to adjust a speed of the fan to maintain battery temperature at or within an allowable tolerance below the optimal temperature curve.

18. The vehicle of claim 13, wherein the first location corresponds to a start of the predetermined route.

19. The vehicle of claim 13, wherein the second location corresponds to an end of the predetermined route.

20. The vehicle of claim 13, wherein the reduced charge is a minimum battery charge limit.

* * * * *